Feb. 27, 1940. C. R. TRAMPIER, SR 2,191,811
FOOD AND WATER DISH FOR ANIMALS
Filed May 2, 1939
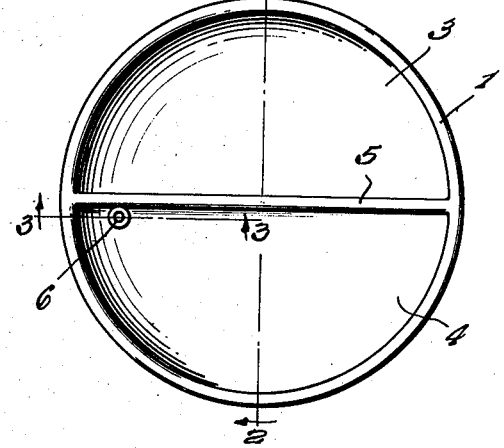
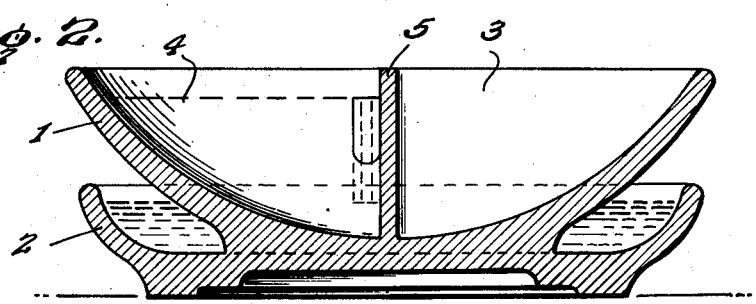
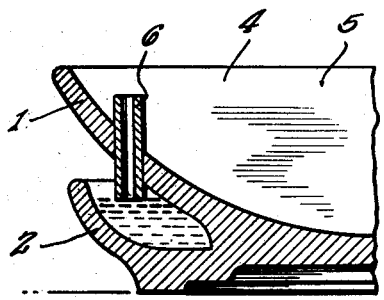
Inventor
C. R. Trampier, Sr.
By Ross J. Woodward
Attorney Patented Feb. 27, 1940

2,191,811

UNITED STATES PATENT OFFICE 2,191,811

FOOD AND WATER DISH FOR ANIMALS

Charles R. Trampier, Sr., St. Louis, Mo.

Application May 2, 1939, Serial No. 271,385

1 Claim. (Cl. 119—51)

This invention relates to an improved food and water dish for animals and it is one object of the invention to provide a dish of this character of such construction that the main receptacle for holding food and drinking water is surrounded by a trough adapted to be filled with water and constitute a water barrier serving to prevent bugs and other insects from crawling up the sides of the bowl or main receptacle and into the same.

Another object of the invention is to provide a dish of this character wherein the trough is formed integral with the bottom of the main bowl and serves not only as a trough to be filled with water but also constitutes an enlarged base for the bowl and prevents the same from being easily tipped and the contents of the bowl spilled when an animal is feeding or drinking from the bowl.

A further object of the invention is to provide a dish having means for delivering water from the main bowl to the trough, thus allowing the trough to be filled from the bowl instead of by pouring water directly into the trough.

And the invention has as a still further object to provide a dish consisting of a bowl and trough formed as a single unit and capable of being manufactured at low cost and sold at a reasonable price.

The invention is illustrated in the accompanying drawing, wherein:

Fig. 1 is a top plan view of a food and water dish of the improved construction.

Fig. 2 is a sectional view on an enlarged scale, taken diametrically through the dish on the line 2—2 of Fig. 1.

Fig. 3 is a fragmentary sectional view taken along the line 3—3 of Fig. 1.

This improved food and water dish has a body or main receptacle in the form of a bowl 1, which may be of any desired diameter and depth. The dish is preferably formed of pottery but it is to be understood that it may be formed of any desired material. About the bottom of the bowl is formed a trough 2 which is of appreciably greater diameter than the bottom of the bowl, as shown in Fig. 2, and projects radially therefrom to such an extent that it serves as an enlarged base for the bowl and prevents the bowl from being easily tipped over and the contents thereof spilled upon the ground or the floor of a room. Walls of the trough extend upwardly to such an extent that quite a depth of water may be held in the trough and constitute a water barrier which will very effectively prevent bugs and other insects from reaching the bowl and crawling up the sides thereof into the bowl. It will thus be seen that when food and water are in the bowl, insects will be prevented from crawling into the bowl and contaminating the contents thereof. The bowl is divided into compartments 3 and 4 by a partition 5, the compartment 3 being for food and the compartment 4 being for water.

The trough is to be filled with water and water is delivered into the trough from the compartment 4 of the bowl through a tube 6 which is preferably formed integral with the bowl but may be a tube set in place through the bowl and rigidly united thereto during manufacture of the dish. While the tube has been shown close to the partition, it will be understood that it may be located at any point desired in which its lower end will extend downwardly from the bowl and into the trough, as shown in Fig. 3. The upper portion of the tube projects upwardly into the bowl sufficiently to create a desired depth of water in the bowl before the water will overflow through the tube and fill the trough. It will thus be seen that when water is poured into the compartment 4, it will fill the compartment to the upper end of the tube and then flow through the tube and fill the trough. An animal may then drink from the compartment or chamber 4 and the water in the trough will very effectively prevent insects from reaching the bowl and crawling up the sides thereof and into the compartment 3 where food is placed for the animal.

If desired, water may be poured directly into the trough instead of being delivered from the bowl into the trough. Insect repelling powder or any other suitable substance may be placed in the trough, instead of water, if desired.

Having thus described the invention, what is claimed is:

An animal's dish comprising a bowl, a trough surrounding the lower portion of said bowl, a partition extending horizontally through the bowl and dividing the bowl into a food compartment and a water compartment, and a conduit extending vertically through the wall of the bowl with its lower portion extending downwardly therefrom externally of the bowl and into the trough, the upper portion of the conduit projecting upwardly from the wall along a side of the partition with its upper end terminating in downward spaced relation to the upper edge of the partition whereby water may accumulate in the water compartment to a predetermined depth and overflow through the conduit and fill the trough.

CHARLES R. TRAMPIER, Sr.